US011221032B2

(12) United States Patent
Kudo et al.

(10) Patent No.: US 11,221,032 B2
(45) Date of Patent: Jan. 11, 2022

(54) TERMINAL BLOCK

(71) Applicant: Sumitomo Wiring Systems, Ltd., Mie (JP)

(72) Inventors: Yasuhiro Kudo, Mie (JP); Kan Murai, Mie (JP)

(73) Assignee: Sumitomo Wiring Systems, Ltd.

( * ) Notice: Subject to any disclaimer, the term of this patent is extended or adjusted under 35 U.S.C. 154(b) by 94 days.

(21) Appl. No.: 16/619,510

(22) PCT Filed: Jun. 15, 2018

(86) PCT No.: PCT/JP2018/022854
§ 371 (c)(1),
(2) Date: Dec. 5, 2019

(87) PCT Pub. No.: WO2019/009042
PCT Pub. Date: Jan. 10, 2019

(65) Prior Publication Data
US 2020/0149567 A1 May 14, 2020

(30) Foreign Application Priority Data
Jul. 4, 2017 (JP) .............................. JP2017-131043

(51) Int. Cl.
H01R 9/24 (2006.01)
F16B 5/02 (2006.01)
B29C 65/56 (2006.01)
H01R 9/16 (2006.01)

(52) U.S. Cl.
CPC ................ F16B 5/02 (2013.01); B29C 65/56 (2013.01); H01R 9/16 (2013.01); H01R 9/24 (2013.01)

(58) Field of Classification Search
CPC .. F16B 5/02; B29C 45/14336; B29C 45/0025
See application file for complete search history.

(56) References Cited

U.S. PATENT DOCUMENTS

| 5,255,647 A | 10/1993 | Kiczek |
| 10,132,342 B2 | 11/2018 | Mori et al. |
| 2002/0106257 A1 | 8/2002 | Braun et al. |

FOREIGN PATENT DOCUMENTS

| JP | 07-269530 | 10/1995 |
| JP | 07269530 A | * 10/1995 |
| JP | 2008-34023 | 12/2008 |
| JP | 2011-160619 | 8/2011 |
| JP | 2011160619 A | * 8/2011 |

(Continued)

OTHER PUBLICATIONS

English translation JP-07269530-A (Year: 1995).*
English translation JP-2011160619-A (Year: 2011).*
International Search Report dated Aug. 21, 2018.

Primary Examiner — Jason L Vaughan
Assistant Examiner — Amanda Kreiling
(74) Attorney, Agent, or Firm — Gerald E. Hespos; Michael J. Porco; Matthew T. Hespos

(57) ABSTRACT

A terminal block 1 includes a plate-like pedestal portion 10 provided with open collar mounting holes 12, and tubular collars 20 to be mounted into the collar mounting holes 12. An inner surface of the collar 20 is so tapered that an inner diameter decreases from one opening 13 of the collar mounting hole 12 toward another opening 13 of the collar mounting hole 12.

5 Claims, 8 Drawing Sheets

(56) References Cited

FOREIGN PATENT DOCUMENTS

| | | |
|---|---|---|
| JP | 2012-251583 | 12/2012 |
| JP | 2017-082843 | 5/2017 |
| WO | 2016/117062 | 7/2016 |

* cited by examiner

TERMINAL BLOCK

BACKGROUND

Field of the Invention

This specification relates to a terminal block.

Related Art

Japanese Unexamined Patent Publication No. 2011-160619 discloses an example of a conventional terminal block for a rotating electric machine. This terminal block for rotating electric machine includes a plate-like pedestal and a signal connector provided on the pedestal. Four collars are embedded in four corners of the pedestal by insert molding. More particularly, projections generally are provided on four corners of a mold for the pedestal. The collars then are fit respectively on the projections on the four corners of the mold and resin is poured into the mold so that the four collars are embedded in the pedestal.

Generally, the amount of resin deviates at each location during resin molding. Thus, the plate-like pedestal is warped either upward or downward. To solve this warping, the pedestal portion needs to be molded in a state warped in advance in a direction opposite to a warping direction.

However, a part of the mold for the pedestal needs to be inclined to perform molding with the warped pedestal. If the part of the mold for the pedestal is inclined, the projections on the four corners of the mold also need to be inclined. Thus, when resin is poured into the mold and an attempt is made to remove the mold after molding, the problem is that the projections are caught by the collars and the mold cannot be removed.

SUMMARY

A terminal block disclosed by this specification includes a plate-like pedestal provided with an open collar mounting hole, and a tubular collar to be mounted into the collar mounting hole. An inner surface of the collar is tapered so that an inner diameter decreases from a first opening toward a second opening.

If the plate-like pedestal is formed by resin molding, the pedestal may warp either up or down due to deviation of resin in the pedestal portion. To solve such warping, resin molding needs to be performed by causing the pedestal portion to be warped in advance in a direction opposite to a warping direction. To that end, the pedestal can be warped in the opposite direction by inclining a mold for the pedestal. However, a projection of the mold to be inserted into the collar also needs to be inclined. Thus, if the inner surface of the collar is not tapered as before, the projection of the mold is caught by the inner surface of the collar and the collar cannot be removed from the projection of the mold. However, if the inner surface of the collar is tapered as in the above configuration, the collar can be removed from the projection of the mold without the projection being caught by the inner surface of the collar.

Further, the inner surface of the collar may be tapered so that the inner diameter decreases from the second opening toward the first opening.

By this configuration, in setting the collar on the projection of the mold, the collar can be set regardless of the orientation of the collar and work efficiency in setting the collar can be improved.

The collar may include an embedded portion to be embedded in the pedestal, and an outer surface of the embedded portion may be tapered so that an outer diameter increases from the first opening toward the second opening and tapered so that the outer diameter increases from the second opening toward the first opening.

For example, even if a stress is applied to the collar, a tapered part provided on the outer surface of the embossed portion of the collar is caught by the inner surface of the collar mounting hole so that the collar is held without coming out. By providing the tapered part on the outer surface of the collar in this way, a holding force of the collar can be improved.

The collar may include a second projection projecting from the first opening along an axial direction of the collar and a second projection projecting from the other opening along the axial direction of the collar. The first projection may be tapered so that an outer diameter increases toward an opening edge of the first opening, and the second projection may be tapered so that an outer diameter increases toward an opening edge of the second opening.

In fixing the terminal block by inserting a screw through the collar, an end part of the collar may be caused to project from the opening of the collar mounting hole to prevent a head of the screw from damaging a resin part of the pedestal. If the projection of the collar is not tapered, as before, the collar is caught by the projection of the mold and cannot be removed from the mold. However, by tapering the projections of the collar such that the outer diameters increase toward the opening edges of the openings as in the above configuration, the collar can be removed from the projection.

According to the terminal block disclosed by this specification the projection of the mold inserted into the collar can be removed, even if the pedestal having the collar mounted therein is resin-molded while being warped upward or downward.

DETAILED DESCRIPTION

An embodiment is described with reference to FIGS. 1 to 8.

Figure 1:
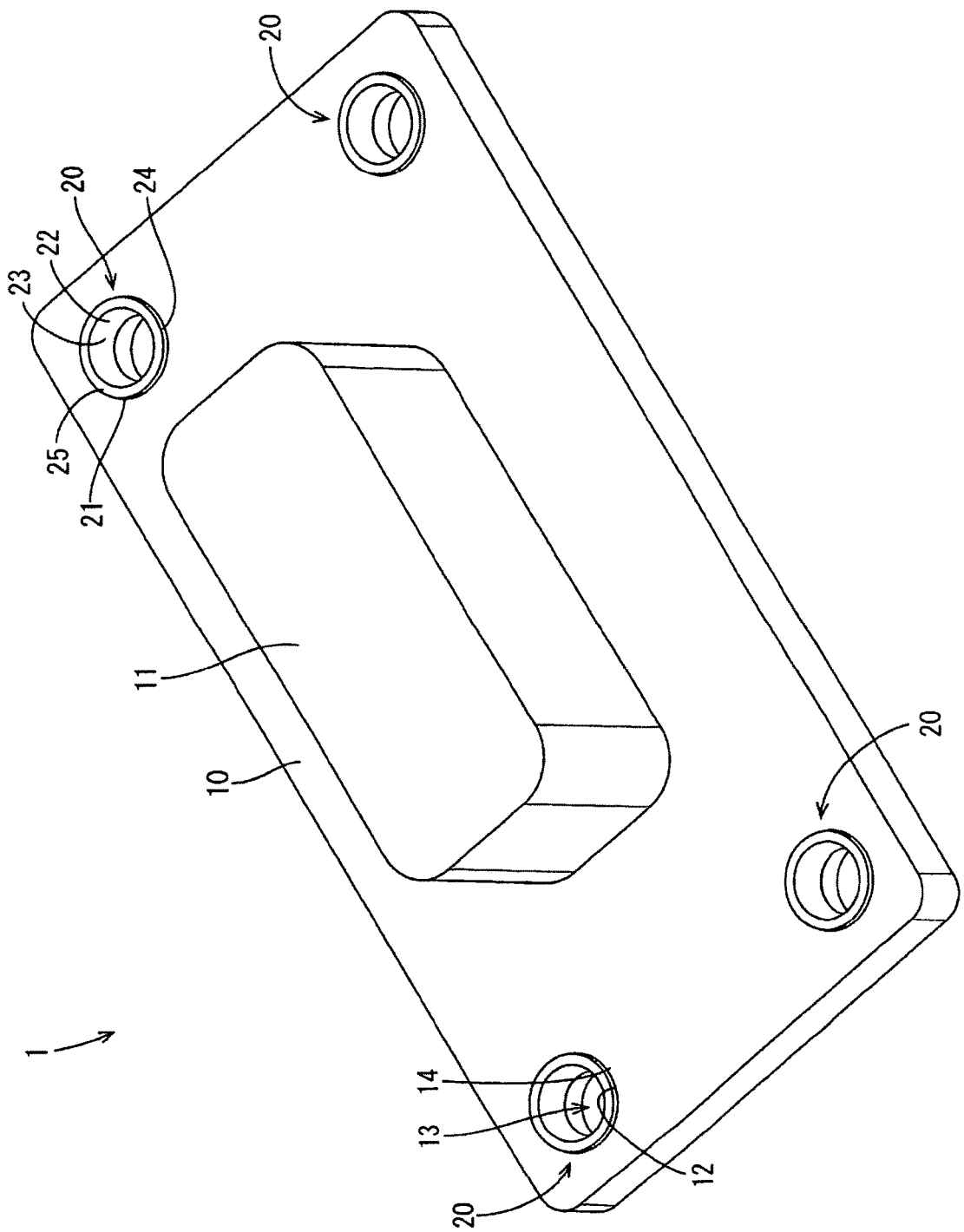
FIG. 1 is a perspective view of a terminal block.
Figure 2:
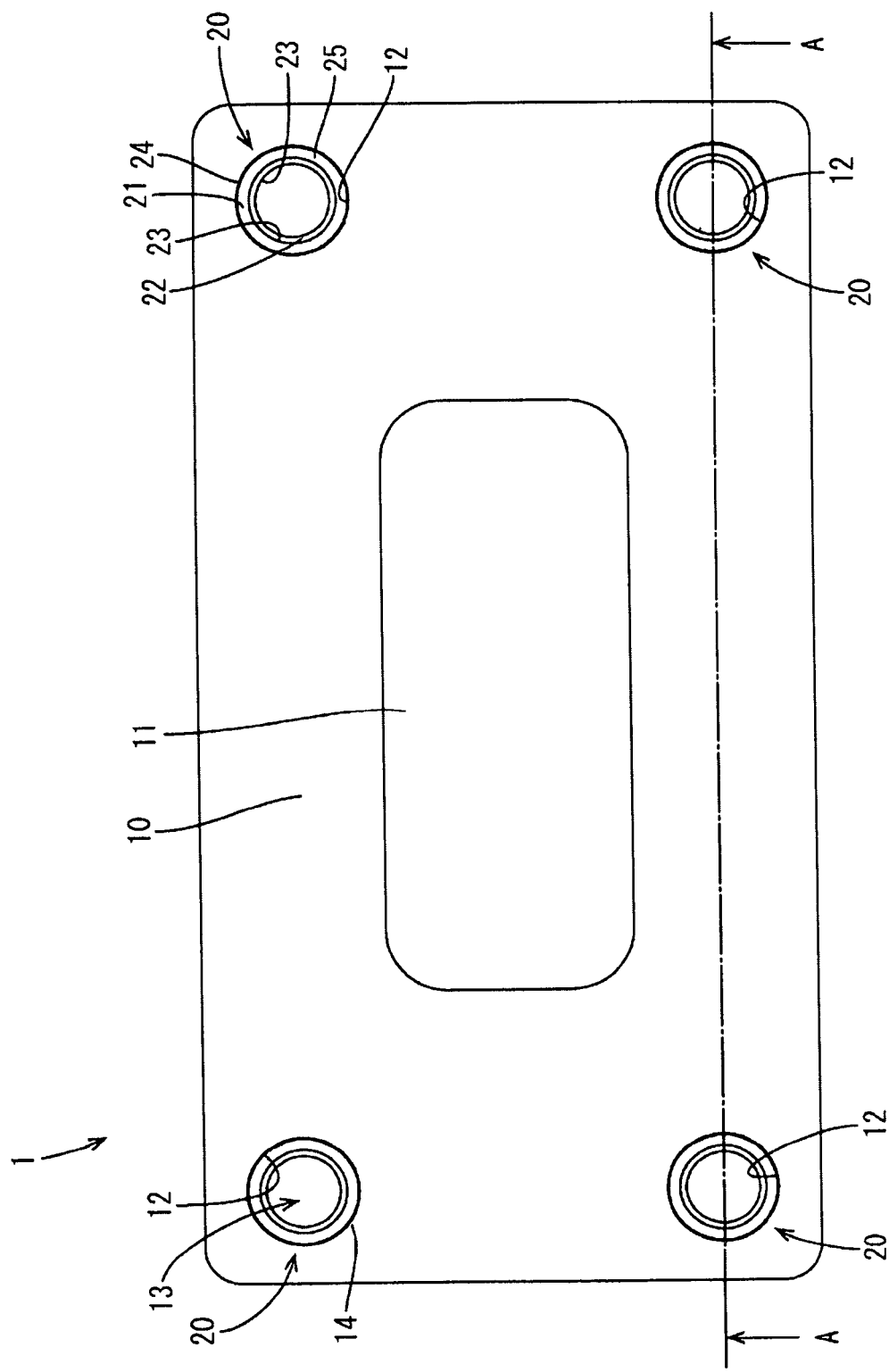
FIG. 2 is a plan view of the terminal block.
Figure 3:
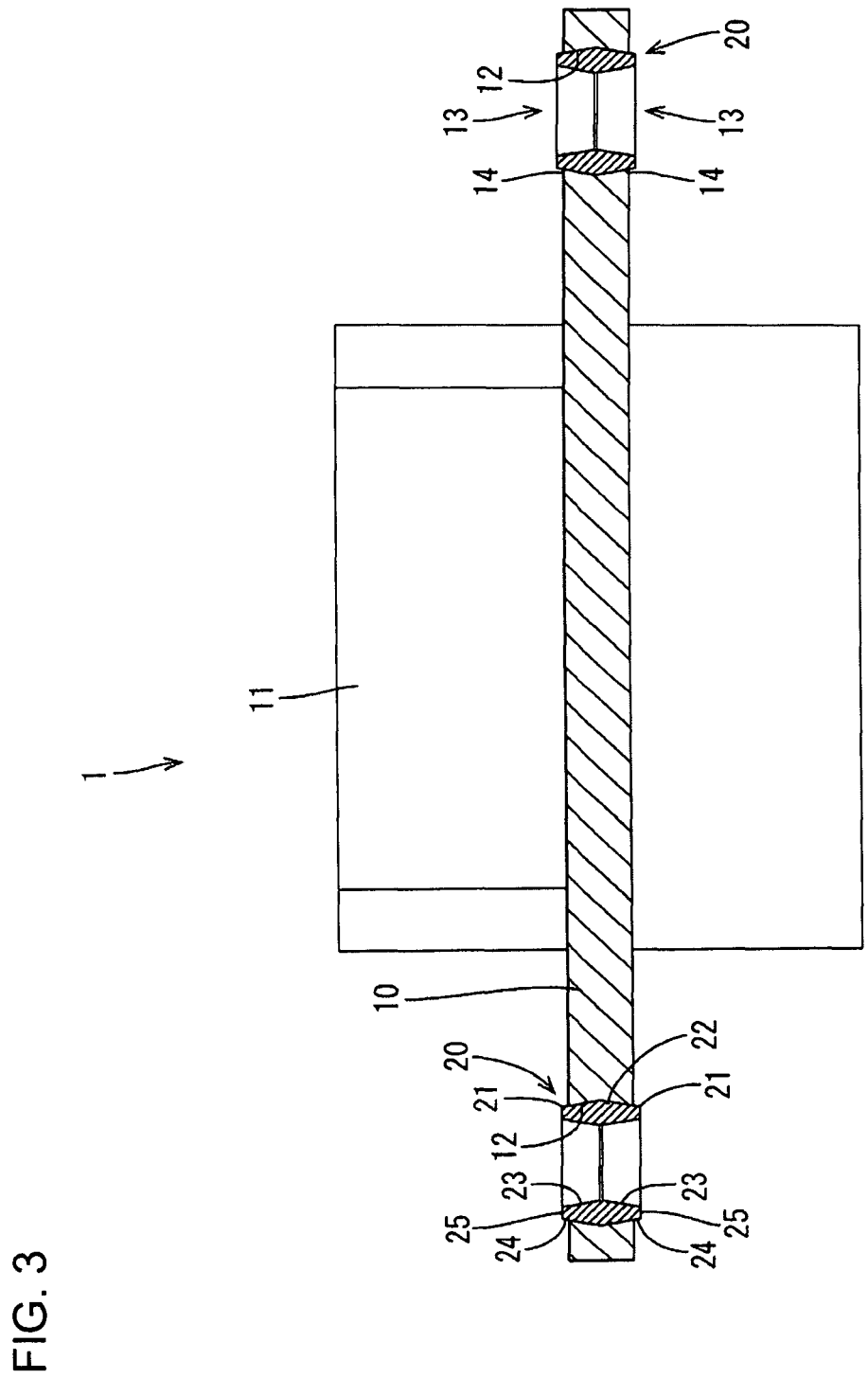
FIG. 3 is a section along A-A of FIG. 2 in a state where a pedestal portion is not warped.

A terminal block 1 of this embodiment includes a pedestal 10 and a housing 11, as shown in FIG. 1. In the following description, upper and lower sides of FIG. 3 are referred to as upper and lower sides.

As shown in FIG. 1, the pedestal 10 is a rectangular plate. The housing 11 has a rectangular shape in a plan view and projects up from a central part of the pedestal 10. The pedestal 10 and the housing 11 are formed integrally by resin molding.

Figure 4:
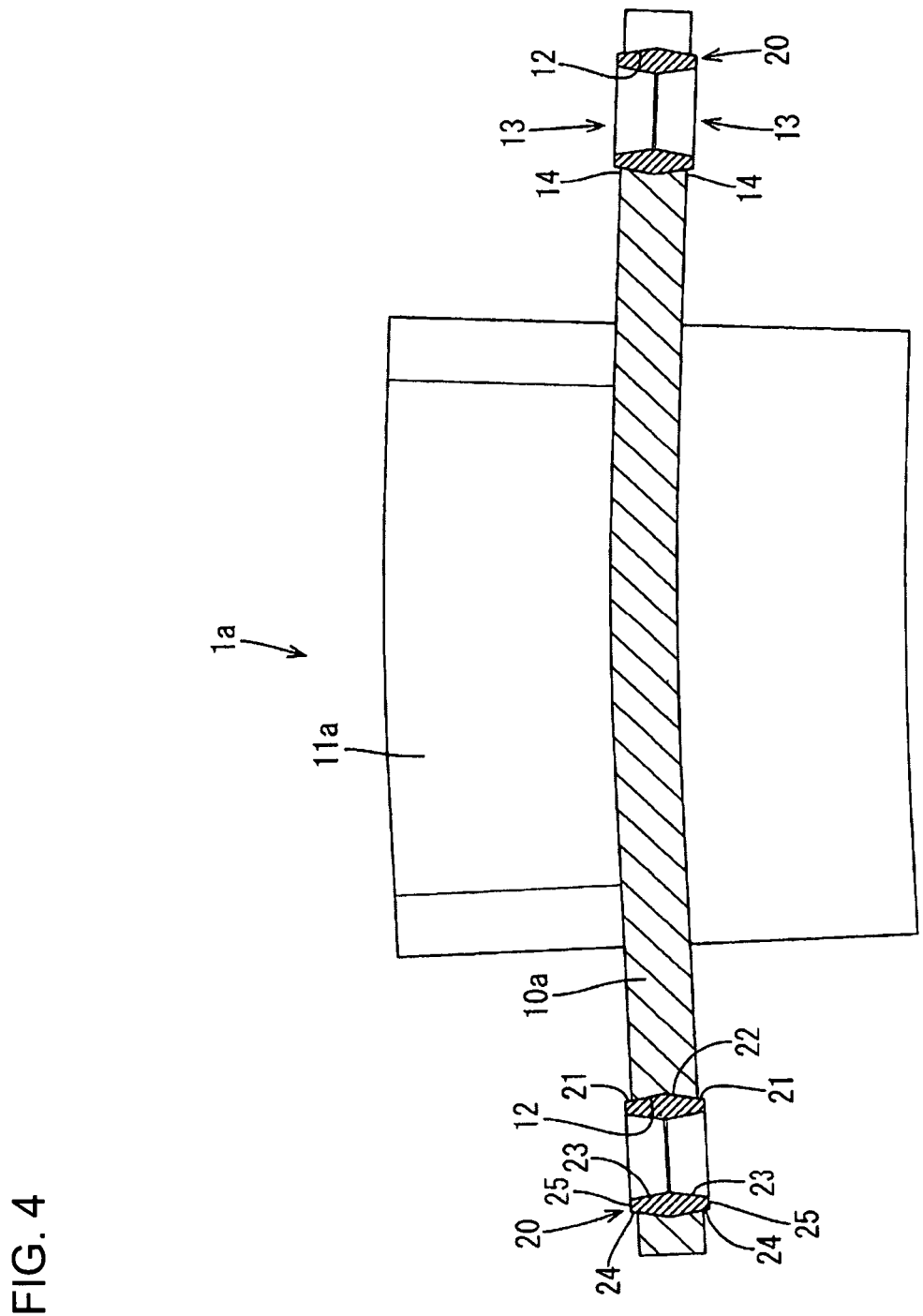
FIG. 4 is a section along A-A of FIG. 2 in a state where the pedestal portion is warped downward.
Figure 5:
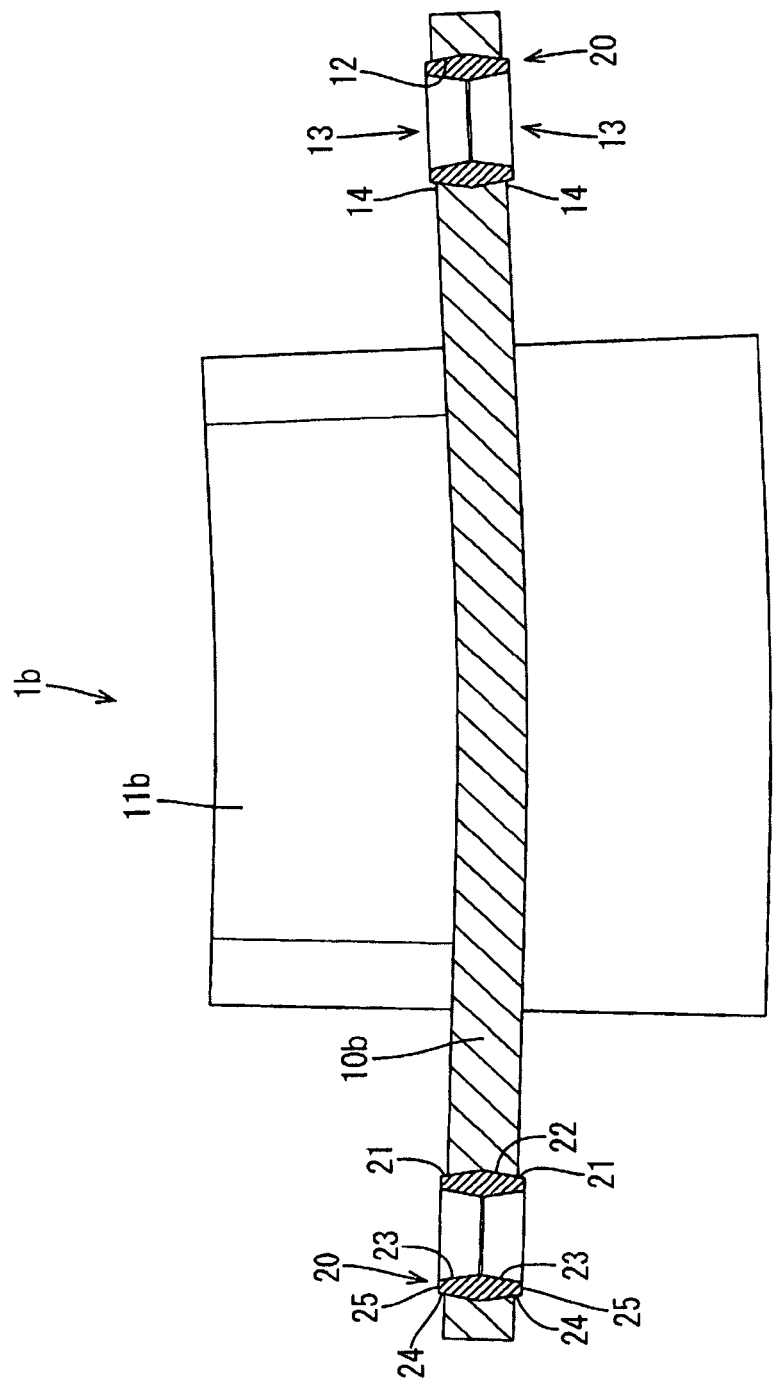
FIG. 5 is a section along A-A of FIG. 2 in a state where the pedestal portion is warped upward.
Figure 6:
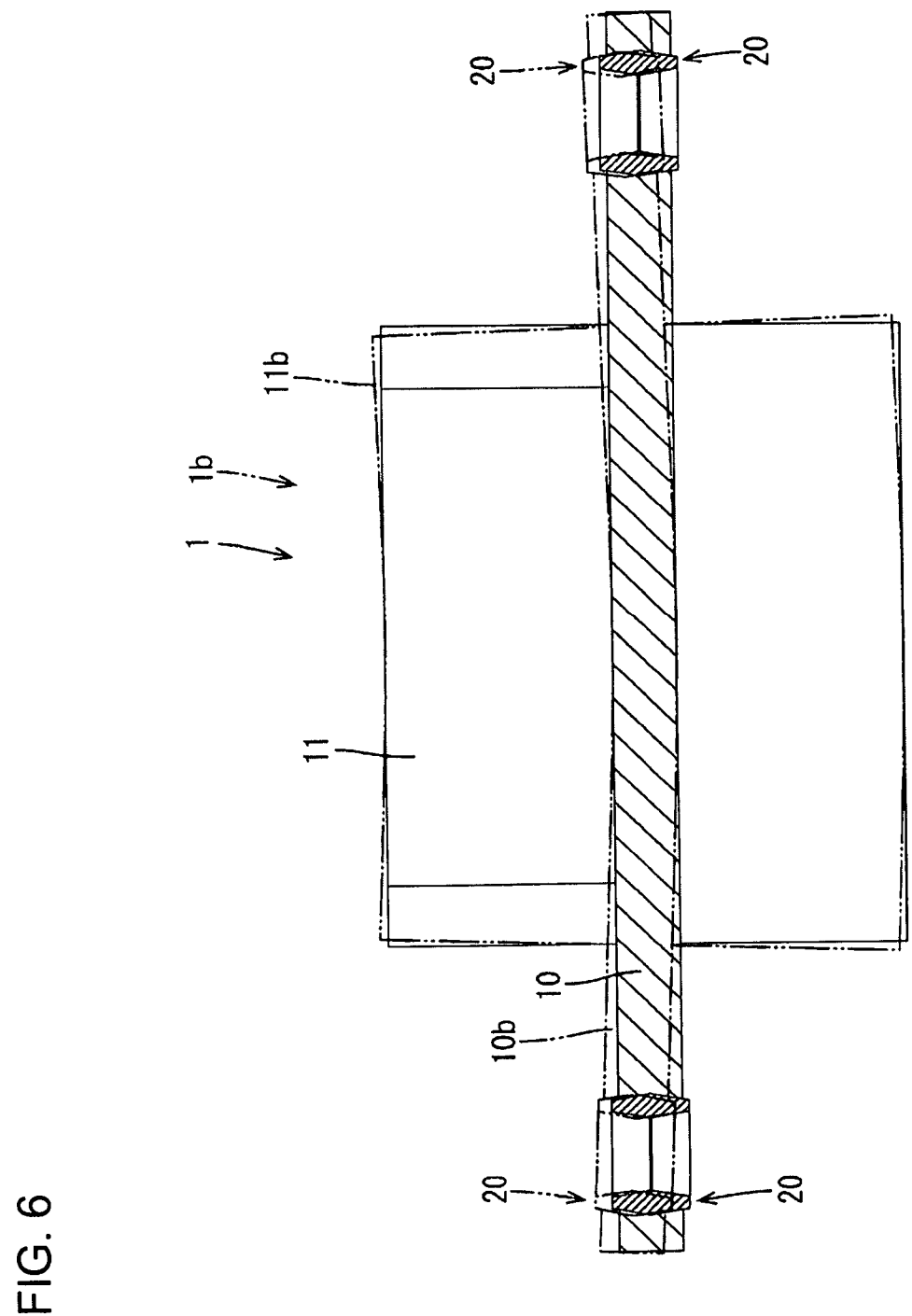
FIG. 6 is a section along A-A of FIG. 2 showing a change from the state where the pedestal portion is warped upward to the state where the pedestal portion is not warped.

The pedestal 10 and the housing 11 immediately after resin is injected into a mold 30 to be described later are shaped to be parallel as shown in FIG. 1. However, the resin is solidified after a predetermined time, and the pedestal 10 and the housing 11 are warped either up or down due to deviation of resin in the terminal block 1. For example, in this embodiment, a pedestal 10a and a housing 11a of a terminal block 1a are warped down, as shown in FIG. 4. To solve this warping, resin molding is performed such that a pedestal 10b and a housing 11b of a terminal block 1b are warped up in advance, as shown in FIG. 5. In this way, the pedestal 10 and the housing 11 are shaped to be parallel, as shown in FIG. 6, when a predetermined time elapses and the resin is solidified.

Collar mounting holes 12 are open on four corners of the pedestal 10. A collar 20 made of metal is mounted into each collar mounting hole 12 by insert molding.

As shown in FIGS. 1 and 3, the collar 20 has a tubular shape and is composed of projections 21 respectively projecting up and down from upper and lower openings 13 of the cam mounting hole 12 and an embedded portion 22 embedded inside the cam mounting hole 12.

As shown in FIG. 3, an inner surface taper 23 is provided on the inner surface of the collar 20 and has an inner diameter decreased toward a lower side from an upper end 25 of the collar 20. Further, an inner surface taper 23 is provided on the inner surface of the collar 20 and has an inner diameter decreased toward an upper side from a lower end part 25 of the collar 20. By this configuration, in setting the collar 20 on a projection 51 of a lower mold 50 to be described later, the collar 20 can be set regardless of the orientation of the collar 20 and workability in setting the collar 20 in the lower mold 50 can be improved.

As shown in FIG. 3, an outer surface taper 24 is provided on the outer surface of the collar 20 and has a diameter increased toward a lower side from the upper end part 25 of the collar 20. An outer surface taper 24 is provided on the outer surface of the collar 20 and has a diameter increased toward an upper side from the lower end part 25 of the collar 20. By this configuration, even if a stress is applied to the collar 20, the outer surface tapers 24 are caught by the inner surface of the cam mounting hole 12 so that the collar 20 is held without coming out. By providing the outer surface tapers 24 in this way, a holding force of the collar 20 can be improved.

Angles of inclination of the inner surface tapers 23 and those of the outer surface tapers 24 are larger than an angle of inclination of the pedestal 10b in a state warped upward. In this way, when the terminal block 1 is resin-molded, later-described projections 41 of an upper mold 40 and projections 51 of the lower mold 50 that are inserted into the collars 20 can be removed from the collars 20.

Figure 7:
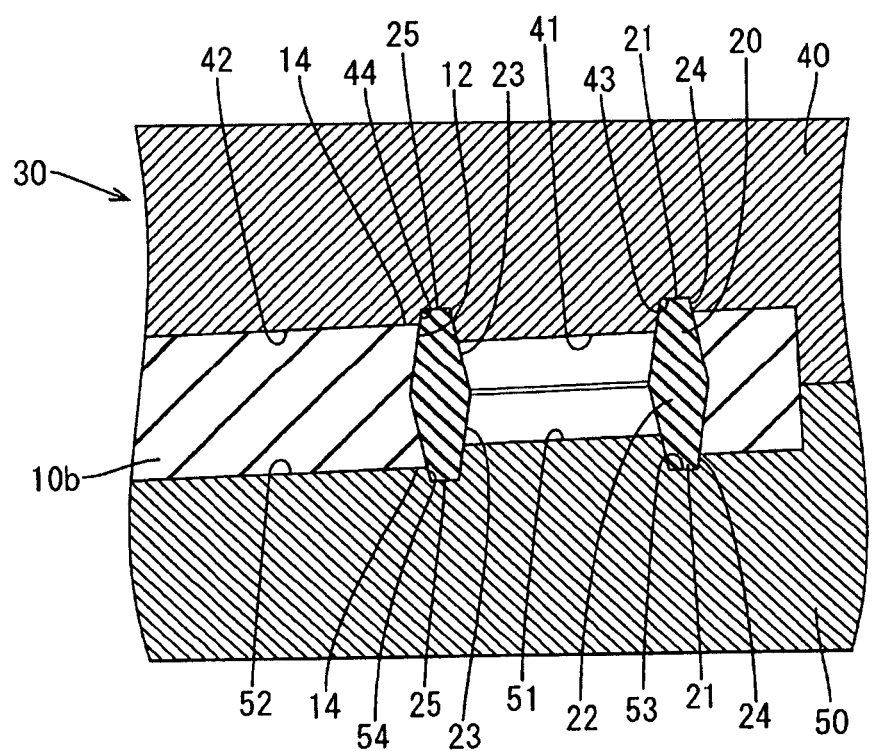
FIG. 7 is a section near a collar after resin is injected into a mold.

As shown in FIG. 7, the resin molding of the terminal block 1 is performed by injecting resin into the mold 30. The mold 30 is composed of the upper mold 40 and the lower mold 50.

A pedestal surface 52 of the lower mold 50 for forming the pedestal 10 is somewhat inclined to warp the pedestal 10 upward. The lower mold 50 is provided with the projections 51 projecting in a normal direction from the pedestal surface 52. Further, groove-like recesses 53 are provided around base ends of the projections 51 and are recessed from the pedestal surface 52.

The projection 51 of the lower mold 50 has a truncated conical shape that becomes narrower toward an upper side in the normal direction of the pedestal surface 52. Further, the recess 53 of the lower mold 50 has an inner peripheral surface 54 radially facing the outer peripheral surface of the projection 51, and this inner peripheral surface 54 is tapered so that a diameter decreases toward a lower side in the normal direction of the pedestal surface 52.

The upper mold 40 is vertically symmetrical with respect to the lower mold 50, and similar to the lower mold 50, the upper mold 40 also is provided with the projections 41, a pedestal surface 42 and recesses 43. Further, the recess 43 of the upper mold 40 has an inner peripheral surface 44 radially facing the outer peripheral surface of the projection 41, similar to the recess 53 of the lower mold 50.

Next, functions of this embodiment are described.

When the collars 20 are fit to the projections 51 of the lower mold 50, as shown in FIG. 7, the lower ends 25 of the collars 20 contact the bottom surfaces of the recesses 53 of the lower mold 50.

Further, the lower outer surface tapers 24 of the collars 20 contact the inner peripheral surfaces 54 of the recesses 53 of the lower mold 50, and the lower inner surface tapers 23 of the collars 20 contact the outer peripheral surfaces of the projections 51 of the lower mold 50.

Subsequently, when the upper mold 40 is lowered and the projections 41 of the upper mold 40 are inserted into the collars 20, the upper end parts 25 of the collars 20 contact the ceiling surfaces of the recesses 43 of the upper mold 40. Further, the upper outer surface tapers 24 of the collars 20 contact the inner peripheral surfaces 44 of the recesses 43 of the upper mold 40 and the upper inner surface tapers 23 contact the outer peripheral surfaces of the projections 41 of the upper mold 40.

Subsequently, resin is injected into the mold 30, and the upper mold 40 is lifted when the resin is solidified. The collars 20 are provided with the inner surface tapers 23 and the outer surface tapers 24. Thus, the collars 20 do not become undercuts and the projections 41 of the upper mold 40 can be removed from the collars 20. Similarly, the projections 51 of the lower mold 50 also can be removed from the collars 20. When a given time elapses after the terminal block 1b is removed from the mold 30, the pedestal 10b and the housing 11b of the terminal block 1b are warped downward and are shaped to be parallel (shapes of the pedestal portion 10 and the housing 11), as shown in FIG. 6.

Figure 8:
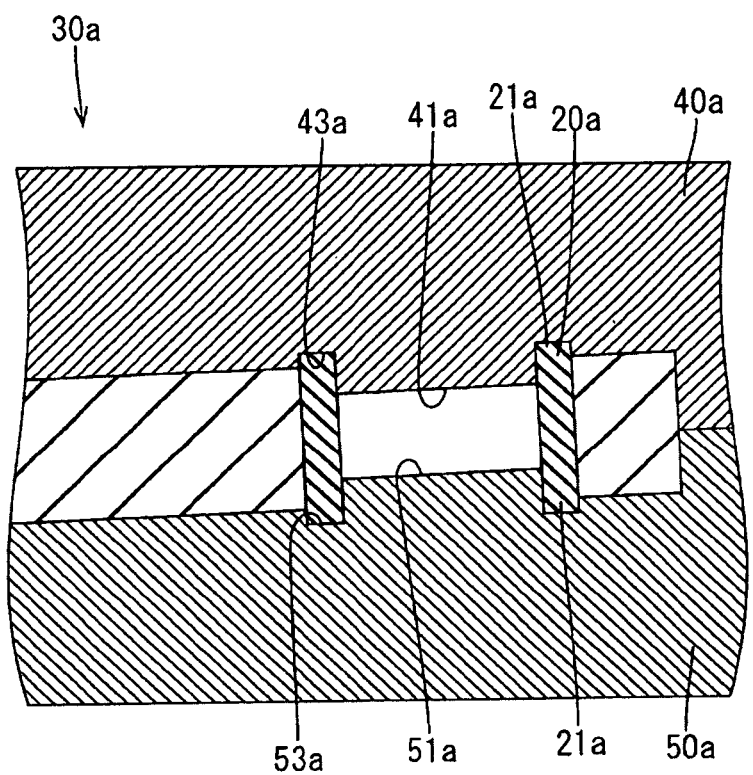
FIG. 8 is a section near a collar after resin is injected into a mold in the case of using a conventional collar.

On the other hand, if collars 20a provided with neither the inner surface tapers 23 nor the outer surface tapers 24 are set in a mold 30a and resin molding is performed as before, projections 41a and recesses 43a of an upper mold 40a are caught by the inner and outer surfaces of the collars 20a, as shown in FIG. 8. Thus, the upper mold 40a cannot be removed from the collars 20a. Similarly, projections Ma of a lower mold 50a cannot be removed from the collars 20a.

As described above, according to this embodiment, if the plate-like pedestal 10 is formed by resin molding, the pedestal 10 may be warped either up or down due to deviation of the resin in the pedestal 10. To solve such warping, resin molding needs to be performed by causing the pedestal 10 to be warped in advance in a direction opposite to a warping direction. To that end, the pedestal 10 can be warped in the opposite direction by inclining the mold 30 for the pedestal 10. However, the projections 41, 51 of the mold 30 to be inserted into the collars 20 also need to be inclined. Thus, if the inner surfaces of the collars 20a are not tapered, as before, the projections 41a, 51a of the mold 30a are caught by the inner surfaces of the collars 20a and the collars 20a cannot be removed from the projections 41a, 51a of the mold 30a. However, if the inner surfaces of the collars 20 are tapered (inner surface tapers 23), as in the above configuration, the collars 20 can be removed from the projections 41, 51 of the mold 30 without the projections 41, 51 being caught by the inner surfaces of the collars 20.

Further, in setting the collars 20 on the projections 51 of the mold 30, the collars 20 can be set regardless of the orientation of the collars 20 and workability in setting the collars 20 can be improved.

For example, even if a stress is applied to the collar 20, the tapered part (outer surface tapers 24) provided on the outer surface of the embedded portion 22 of the collar 20 is caught by the inner surface of the collar mounting hole 12 and the collar 20 is held without coming out. By providing the tapered part (outer surface tapers 24) on the outer surface of the collar 20 in this way, a holding force of the collar 20 can be improved.

Further, in fixing the terminal block 1 by inserting screws through the collars 20, the end parts 25 of the collars 20 may project from the openings 13 of the collar mounting holes 12 to prevent heads of the screws from damaging a resin part of the pedestal 10. If projections 21a of the collars 20a are not tapered, as before, the collars 20a are caught by the projections 41a, 51a of the mold 30a and cannot be removed from the mold 30a. However, by tapering the projections 21 of the collars 20 such that the outer diameter increases toward opening edges 14 of the openings 13 (outer surface tapers 24) as in the above configuration, the collars 20 can be removed from the projections 41, 51.

The invention is not limited to the above-described and illustrated embodiment. For example, the following modes also are included.

Although the collar 20 includes the projections 21 projecting up or down from the upper or lower openings 13 of the collar mounting hole 12 in the above embodiment, the collar may not project from the openings 13.

Although the outer surface of the embedded portion 22 of the collar 20 is tapered in the above embodiment, the shape of the outer surface of the embedded portion does not matter and may not be tapered. Further, to ensure a holding force of the collar to the pedestal, a flange may be provided on the outer surface of the embedded portion to improve the holding force of the collar.

The inner surface tapered portions 23 of the collar 20 are formed such that the inner diameter decreases toward the lower side from the upper end part 25 and decreases toward the upper side from the lower end part 25, but an inner surface tapered portion may be formed such that an inner diameter decreases from either one of upper and lower sides toward the other side.

LIST OF REFERENCE SIGNS 1, 1a, 1b . . . terminal block
10, 10a, 10b . . . pedestal
12 . . . collar mounting hole
13 . . . opening
14 . . . opening edge
20, 20a . . . collar
21, 21a . . . projection
22 . . . embedded portion

The invention claimed is:
1. A terminal block, comprising:
a plate-like pedestal provided with an open collar mounting hole; and
a tubular collar to be mounted into the collar mounting hole, the tubular collar having opposite first and second ends and an inner surface extending between the opposite first and second ends;
wherein the inner surface of the collar has a first tapered portion that is tapered so that an inner diameter of the first tapered portion decreases from a first opening of the collar mounting hole toward a second opening of the collar mounting hole and the inner surface of the collar also has a second tapered portion that is tapered so that an inner diameter of the second tapered portion decreases from the second opening of the collar mounting hole toward the first opening of the collar mounting hole.

2. The terminal block of claim 1, wherein:
the collar includes an embedded portion to be embedded in the pedestal, and
an outer surface of the embedded portion has a first outer tapered portion that is tapered so that an outer diameter of the first outer tapered portion increases from the first opening toward the second opening and the outer surface of the collar also has a second outer tapered portion that is tapered so that the outer diameter of the second outer tapered portion increases from the second opening toward the first opening.

3. The terminal block of claim 2, wherein:
the collar includes a first projection projecting from the first opening along an axial direction of the collar and a second projection projecting from the second opening along the axial direction of the collar;
the first projection is tapered so that an outer diameter increases toward an opening edge of the first opening, and
the second projection is tapered so that an outer diameter increases toward an opening edge of the second opening.

4. The A terminal block, comprising:
a plate-like pedestal provided with an open collar mounting hole; and
a tubular collar to be mounted into the collar mounting hole, the tubular collar having opposite first and second ends and an inner surface extending between the opposite first and second ends: wherein:
the inner surface of the collar has a first tapered portion that is tapered so that an inner diameter of the first tapered portion decreases from a first opening of the collar mounting hole toward a second opening of the collar mounting hole;
the collar includes an embedded portion to be embedded in the pedestal, and
an outer surface of the embedded portion has a first outer tapered portion that is tapered so that an outer diameter increases from the first opening toward the second opening and the outer surface of the collar also has a second outer tapered portion that is tapered so that the outer diameter of the second outer tapered portion increases from the second opening toward the first opening.

5. A terminal block, comprising:
a plate-like pedestal provided with an open collar mounting hole; and
a tubular collar to be mounted into the collar mounting hole, the tubular collar having opposite first and second ends and an inner surface extending between the opposite first and second ends: wherein:
the inner surface of the collar has a first tapered portion that is tapered so that an inner diameter of the first tapered portion decreases from a first opening of the collar mounting hole toward a second opening of the collar mounting hole;
the collar includes a first projection projecting from the first opening along an axial direction of the collar and a second projection projecting from the second opening along the axial direction of the collar;
the first projection is tapered so that an outer diameter increases toward an opening edge of the first opening, and
the second projection is tapered so that an outer diameter increases toward an opening edge of the second opening.

* * * * *